Mar. 27, 1923.
G. D. VAN ARSDALE
1,449,462
METHOD AND APPARATUS FOR THE ELECTROLYTIC RECOVERY OF COPPER
Filed Sept. 24, 1920
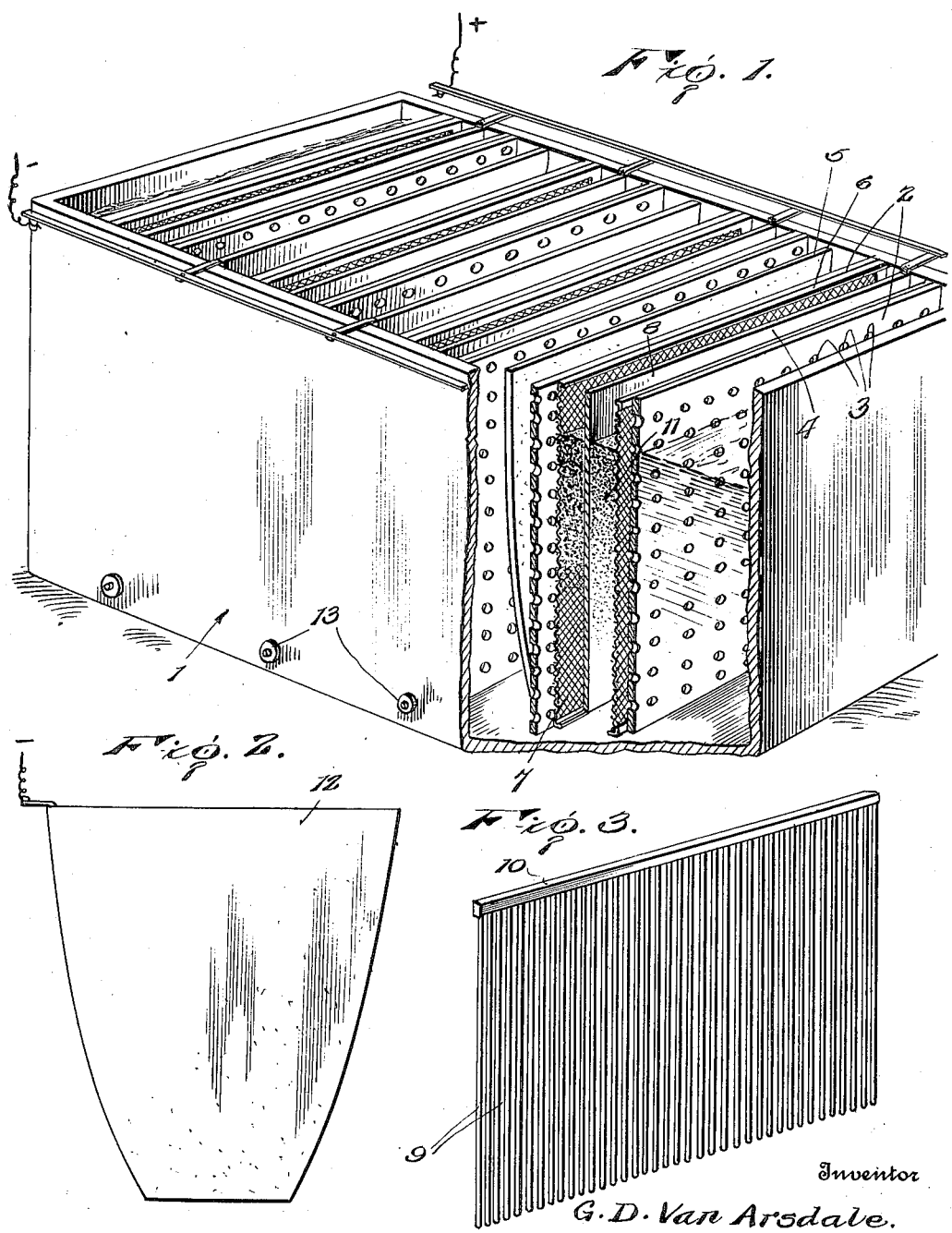

Patented Mar. 27, 1923.

1,449,462

UNITED STATES PATENT OFFICE.

GEORGE D. van ARSDALE, OF NEW YORK, N. Y.

METHOD AND APPARATUS FOR THE ELECTROLYTIC RECOVERY OF COPPER.

Application filed September 24, 1920. Serial No. 412,572.

*To all whom it may concern:*

Be it known that I, GEORGE D. VAN ARSDALE, a citizen of the United States, residing at New York, in the county of New York and State of New York, have invented certain new and useful Improvements in Methods and Apparatus for the Electrolytic Recovery of Copper, of which the following is a specification.

This invention relates to a method of and electrolytic apparatus for the recovery of copper from materials and products bearing this metal and while in the specific description which is to follow, the application of the principles of the invention to the recovery of the metal from cement copper will be set forth in detail, it is to be understood that the invention is not limited to this particular application but may on the other hand be followed in the recovery of copper from materials other than cement copper and which materials are capable of being acted upon electrolytically in accordance with the principles of the invention, examples of such materials being certain kinds of flue dust, copper oxides, etc.

The precipitation of the metal from leach liquors or mine waters by bringing these liquors into contact with metallic iron has been practiced for years in various localities and may be accomplished with facility as the plant required and operation involved are of a simple nature and easily controlled. However, up to the present time no entirely satisfactory method has been evolved for the treatment of the product, cement copper, so that the copper content might be extracted or recovered in good marketable form, as well as the gold and silver contained in the product. Cement copper as produced commercially varies in the percentage of its metallic copper content, depending upon the conditions attending the precipitation of the product and the purity and freedom from oxidation of the iron employed as the precipitant. Also the product will contain all of the insoluble impurities originally present in the precipitant, iron in various combinations precipitated from the liquors, and gold and silver. Therefore the problem has been to recover from the product the copper content in the form of marketable metallic copper, and to recover also the gold and silver present in the product. Where cement copper has been produced in the vicinity of smelters, it has been proposed to, by various methods, absorb and finally put this product into bullion but difficulties have been encountered which render this treatment of the said product difficult and costly. Also it has been found difficult to treat the product in large amounts either alone or with copper ores or other copper products in the reverberatory furnace. On the other hand it has been found impracticable to recover the copper content from dilute leach liquors or mine waters directly by any method of electrolysis.

In consideration of the above, it is the primary object of this invention to evolve a method by the carrying out of which cement copper may be economically treated in a commercially practicable manner for the purpose of recovering the copper content in good marketable form and also recovering any contained gold and silver.

Another object of the invention is to provide an electrolytic apparatus for use in carrying out of the method which apparatus will possess features especially adapting it for this purpose and providing a medium whereby the method may be carried out commercially at a reasonable cost.

Briefly stated, the principle involved is the employment of the material to be treated, namely cement copper, as a part of the anode of the electrolytic cell, the material being partly soluble as a result of electrolysis, the copper content going into solution in the electrolyte and being subsequently deposited at the cathode, and the residue, which contains the gold and silver content of the original product, being insoluble and being removed from the cell from time to time, and another object of the invention is to provide for the establishment and maintenance of the anode within the cell by maintaining a mass of cement copper in electrical contact with another anodic element which in itself is insoluble and not affected by the electrolytic reactions which take place within the cell.

A further object of the present invention is to provide means whereby, as the mass of cement copper comprising the soluble part of the anode is gradually brought into solution, and the insoluble residue from this material is deposited, a uniform current density may be maintained between the electrodes.

It is also an object of the invention to provide means whereby the insoluble anode residue may be withdrawn from the cell at suitable intervals as it accumulates, and without removing from the cell the mass comprising the soluble portion of the anode.

In the accompanying drawings:

Figure 1 is a perspective view partly in section illustrating an electrolytic cell in which the method of the present invention may be carried out;

Figure 2 is a view in elevation of one of the cathodes;

Figure 3 is a similar view illustrating a modification of the insoluble part of the anode.

The drawings illustrate the apparatus which has been especially designed for use in carrying out the method of the present invention and while the apparatus illustrated is in fact adapted for this use, it will be understood that if the occasion arises it may be structurally modified without departing from the principles of the invention.

In order that the manner in which the invention is practiced may be best understood, I will first specifically describe the apparatus illustrated in the drawings and will then describe what takes place during electrolysis.

In Figure 1 the numeral 1 indicates in general an electrolytic cell which in itself is not different from the ordinary cell employed in various electrolytic processes. Arranged in any suitable manner within this cell are a suitable number of pairs of partitions indicated by the numeral 2, these partitions being of any material suitable for the purpose and either removably or permanently arranged and held in place. Each partition 2 is formed with a number of perforations 3 so that the partition thereby permits access of the electrolyte to the material within the compartment. The partitions of each pair define between them a compartment which is indicated by the numeral 4, and adjacent pairs of the partitions define between them compartments which are indicated by the numeral 5, the compartments 4 housing the anodes, and the compartments 5 housing the cathodes, as will be presently explained. As before stated, the material to be treated, namely cement copper, is to constitute a part of each anode and in order that this material may be prevented from passing from the compartments 4 through the perforations 3 in the partition walls 2, a suitable frame 6 is arranged against the inner face of each partition 2 and has stretched within it a sheet 7 of porous material which will not be affected by the acid content of the electrolyte. The interstices of these sheets are much smaller than the perforations 3 and are in fact too small to permit of passage through them of the particles of cement copper although they permit of free circulation of the electrolyte and consequently do not in any way interfere with the soluble copper content of the cement copper material going into solution, and do not interpose any appreciable electrical resistance.

Each anode comprises an element indicated by the numeral 8 which in itself is insoluble in the electrolyte or as a result of the electrolysis and which may be in the form of a plate or sheet of lead as illustrated for example in Figure 1, or which may comprise a number of carbon or graphite rods 9 as illustrated in Figure 3, in which latter event the rods will be mechanically and electrically connected at their upper ends as for example by a bar 10. This anodic element is suspended as for example by any of the usual means employed for the purpose, within the respective anodic compartment 4 parallel to the partition walls 2 and preferably equidistantly spaced between them and above the bottom of the cell 1. Each anode is established not solely by the anodic element 8 just described but by this element in conjunction with a mass of cement copper which is indicated in Figure 1 by the numeral 11 and which is deposited into the anodic compartment in a more or less compact mass filling the spaces at the opposite sides of the insoluble anodic element 8 and between the same and the screens 7 covering the partition walls 2. This soluble constituent of each anode may be supplied to the anodic compartments in any suitable manner as for example by hand or by being fed by some mechanical means, and during electrolysis will be supplied at regular intervals, the frequency of which will be determined by the conditions attending the carrying out of the method. Of course as this material is charged into the anodic compartments it will settle by gravity and will form a more or less compact mass electrically in contact with the insoluble anodic element within the compartment and will therefore properly conduct the electrical current during electrolysis.

The cathodic element is indicated in general by the numeral 12 and one form of this element is clearly illustrated in Figure 2 of the drawings and it will be evident by inspection of Figure 1 that one of these elements is suspended within each of the cathodic compartments 5. For the purposes of the invention as applied to the treatment of cement copper the element 12 will preferably be in the nature of a thin sheet of copper, produced in the same manner as starting sheets in various other electrolytic operations.

The electrolyte employed will be in the nature of a solution of copper sulphate containing a desirable percentage of free sulphuric acid, and this solution may be the acidulated solution ordinarily employed in the electrolysis of copper or it may contain a smaller percentage of free acid or of copper depending upon conditions.

For a purpose to be presently explained the opposite walls of the electrolytic cell 1 are formed with openings located near the bottoms of the anodic compartments 4, and these openings are closed by plugs which are indicated by the numeral 13.

Preparatory to electrolysis, the electrolyte in the required volume is delivered into the electrolytic cell, and cement copper, from which, so far as possible, all free iron and large pieces of copper have been removed, is charged into the anodic compartments 4 within which it will settle forming a compact mass in electrical contact with the insoluble anodic elements 8. In this preparatory step the several anodes of the cell are completed or established and they are maintained by periodically delivering cement copper into the anodic compartments. Upon passing of the electric current, the copper content of the cement copper will be brought into solution and finally converted and deposited in the form of metallic copper upon the cathodic elements comprising the sheets 12. As the copper content of the cement copper goes into solution, an insoluble residue from this material will be deposited finally in the bottom of the anodic compartments and this residue will contain any gold and silver originally present in the cement copper. This residue may be removed from time to time by any suitable mechanical means after removal of the plugs 13, and while the present invention is not in any way concerned with the future treatment of this residue for the purpose of extracting its gold and silver contents, nevertheless it is an important feature of the invention that these valuable materials are recovered.

Of course as electrolysis proceeds and the copper content of the cement copper comprising the soluble portions of the anode, is brought into solution, the mass of this material will at the same time become less and less rich in its copper content from the top to the bottom. As a result the conductivity of this portion of each anode will progressively decrease in a downward direction. Unless some means were provided to counteract this decrease in conductivity, there would result an uneven distribution of current density at the cathodes and the copper would be deposited at these points unevenly, thus in all probability resulting in short circuiting of the cathodes. To avoid this result the cathodic elements 12 are preferably formed as illustrated in Figure 2 of the drawings, namely by so cutting the plates comprising these elements that the plates will be gradually decreased in width from their upper to their lower ends, the lateral edges of the plates being extended either along curved lines as shown in this figure or along straight lines. By thus progressively decreasing the conductive area of the cathodic elements in a downward direction, I successfully meet the condition of progressively decreased conductivity of the anodes in the same direction and thus attain a uniform distribution of current density and therefore an even deposition of metallic copper upon the cathodic elements.

Of course as electrolysis proceeds and after the cathodic starting plates have been built up to the required thickness by the deposition of metallic copper thereon, these plates are removed and other plates substituted therefor. Thus by renewing the cathodic plates from time to time and replenishing the anodic compartments with fresh quantities of cement copper and, as required circulating the electrolyte and removing suitable portions of the electrolyte and introducing fresh electrolyte for the purpose of controlling accumulation of impurities therein, the process of electrolysis may be carried on practically continuously. It will be understood also that by this method the copper content of the anodic material employed is recovered as substantially pure metallic copper and that by removing the residue from the anodic compartments, the precious metal content of the original material may be recovered.

As concerns the anodic and cathodic elements of the apparatus, it will be evident from the foregoing that the progressive dissolution of the anodic material under electrolysis is a factor which must be compensated for and that this is accomplished by proportioning the conductive area of the cathodic electrode as heretofore explained.

It is also evident from the foregoing that without provision for the removal of residual insoluble impurities the process could not be made continuous, but that by operating as shown no accumulation of insoluble materials takes place except at the bottom of the cell, to which position they descend automatically and from which they can be removed readily. The anode as described therefore is a compound anode, a part of which is insoluble and a part of which is soluble and also automatically movable with respect to the insoluble portion.

Having thus described the invention, what is claimed as new is:

1. The process for extracting copper in metallic form from cement copper in an electrolytic cell which comprises initially introducing into the cell a mass of cement copper in electro-conductive contact with an anodic element which is insoluble as a result of the electrolysis, and replenishing the cement copper as portions thereof are carried into solution and the consequent reduction in conductivity thereof.

2. A method of recovering a metal from material bearing the same which comprises electrolyzing the material in contact with one electrode of an electrolytic cell and in association with another electrode the conductive area of which is proportioned in consonance with the factor of dissolution of the material under electrolysis and the consequent reduction in conductivity thereof.

3. A method of recovering copper in metallic form from cement copper which comprises electrolyzing the material in contact with one electrode of an electrolytic cell and in association with another electrode the conductive area of which is proportioned in consonance with the factor of dissolution of the material under electrolysis and the consequent reduction in conductivity thereof.

4. The method of recovering copper from material bearing the same which comprises establishing, in an electrolytic cell, an anode comprising an element which is insoluble as the result of the electrolysis and further comprising a mass of the material in electro-conductive contact with the said element, in association with another electrode the conductive area of which is proportioned in consonance with the factor of dissolution of the said material under electrolysis and the consequent reduction in conductivity thereof.

5. A method of recovering copper in metallic form from cement copper by electrolysis which comprises maintaining, in an electrolytic cell, a mass of cement copper in electro-conductive contact with an anodic element which is insoluble as a result of the electrolysis, and in association with a cathodic element the conductive area of which is proportioned in consonance with the factor of dissolution of the cement copper during the electrolysis and the consequent reduction in conductivity thereof.

6. The method of recovering copper in metallic form from cement copper in an electrolytic cell and by electrolysis which comprises establishing a mass of cement copper in contact with an anodic element which is insoluble as the result of the electrolysis and confining the said mass of cement copper in a manner to prevent movement of the mass during dissolution except in a direction substantially parallel to the said insoluble anodic element, in association with a cathodic element the conductive area of which is proportioned in consonance with the factor of dissolution of the cement copper during electrolysis and the consequent reduction in conductivity thereof.

7. The method of recovering copper in metallic form from cement copper in an electrolytic cell and as a result of electrolysis which comprises establishing a mass of cement copper in electro-conductive contact with an anodic element which is insoluble as a result of the electrolysis and so confining the mass of cement copper as to maintain the same in such contact with the said anodic element and also in a manner to prevent movement of the said mass during dissolution, except in a downward direction by gravity substantially parallel to the said element, in association with a cathodic element the conductive area of which is proportioned in consonance with the factor of dissolution of the cement copper during electrolysis and the consequent reduction in conductivity thereof.

8. An anodic structure for an electrolytic cell comprising spaced porous partition walls, an anodic element supported between said walls and comprising a material which is insoluble as a result of the process of electrolysis in which the anodic structure is to be employed, and a mass of cement copper contained within the cell in freely movable electro-conductive contact with the said anodic element.

9. A cathodic element for employment in a process of electrolysis in association with an anodic element, a portion of which is subject to dissolution as a result of electrolysis, the said cathodic element being diminished in conductive area in one direction.

10. The method of recovering copper and gold and silver from cement copper, which comprises electrolyzing cement copper in an anodic compartment arranged for the circulation of the electrolyte, in an electrolytic cell within which the cement copper is maintained in electro-conductive contact with an anodic element insoluble as result of the electrolysis, whereby to effect solution of the copper content of the cement copper and deposition of the copper content in metallic form at the cathode, and collecting within and removing from the said cell the insoluble residue from the cement copper containing the gold and silver.

11. Electrolytic apparatus of the class described comprising a cell, perforated partition walls dividing the cell into compartments, a cathodic electrode supported within one of said compartments, formaninous sheets lining the partition walls defining the other compartment, an insoluble anodic electrode in the last mentioned compartment, and a mass of cement copper in the last mentioned compartment in electro-conductive contact with the said anodic element and constituting a soluble part of the same.

In testimony whereof I affix my signature.

GEORGE D. van. ARSDALE.